(12) United States Patent
Pettis et al.

(10) Patent No.: US 9,440,399 B2
(45) Date of Patent: Sep. 13, 2016

(54) PHOTO BOOTH FOR THREE-DIMENSIONAL IMAGES

(71) Applicant: MakerBot Industries, LLC, Brooklyn, NY (US)

(72) Inventors: Nathaniel B. Pettis, Brooklyn, NY (US); Jennifer J. Lawton, Fairfield, CT (US); John Michael Briscella, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 14/192,087

(22) Filed: Feb. 27, 2014

(65) Prior Publication Data

US 2014/0240794 A1    Aug. 28, 2014

Related U.S. Application Data

(63) Continuation of application No. 13/962,607, filed on Aug. 8, 2013.

(60) Provisional application No. 61/680,989, filed on Aug. 8, 2012.

(51) Int. Cl.
| | | |
|---|---|---|
| *B29C 47/00* | (2006.01) | |
| *B29C 67/00* | (2006.01) | |
| *G06F 17/50* | (2006.01) | |
| *H04N 1/00* | (2006.01) | |

(52) U.S. Cl.
CPC ....... *B29C 67/0088* (2013.01); *B29C 67/0051* (2013.01); *B29C 67/0055* (2013.01); *G06F 17/5009* (2013.01); *H04N 1/00827* (2013.01)

(58) Field of Classification Search
CPC .......... B29C 67/0088; B29C 67/0051; B29C 67/0055
See application file for complete search history.

(56) References Cited

U.S. PATENT DOCUMENTS

| | | | |
|---|---|---|---|
| 6,377,865 B1 * | 4/2002 | Edelsbrunner et al. | ........ 700/98 |
| 7,184,047 B1 | 2/2007 | Crampton et al. | |
| 2002/0085219 A1 * | 7/2002 | Ramamoorthy | ............... 358/1.9 |
| 2014/0042670 A1 | 2/2014 | Pettis et al. | |
| 2014/0249662 A1 | 9/2014 | Pettis et al. | |

OTHER PUBLICATIONS

"3D Data Capture and 3D Imaging Earn 'Street Cred' at Rapid 2012", RapidProductDevelopment.biz, Jun. 1, 2012, 11 pages.

(Continued)

*Primary Examiner* — Joseph S Del Sole
*Assistant Examiner* — John Robitaille
(74) *Attorney, Agent, or Firm* — Strategic Patents, P.C.

(57) ABSTRACT

A photo booth is configured with a three-dimensional scanner, a display with a user interface coupled to the photo booth, a network interface configured to couple the photo booth in a communicating relationship with a remote processing resource, and processing circuitry. The processing circuitry may be configured to associate a user identifier and a user with a subject, capture a scan of the subject in the photo booth with the three-dimensional scanner, process the scan to obtain a three-dimensional model of the subject, receive a user customization of the three-dimensional model in the user interface, the user customization resulting in a modification of the three-dimensional model, create a fabrication-ready digital model of the three-dimensional model including the modification, and store the fabrication-ready digital model.

20 Claims, 4 Drawing Sheets

(56) References Cited

OTHER PUBLICATIONS

USPTO, "U.S. Appl. No. 13/962,607, Non-Final Office Action mailed Jan. 16, 2015", 11 pages.
USPTO, "U.S. Appl. No. 13/962,607, Final Office Action mailed Sep. 24, 2015", 9 pages.
Canfield, "Vectra M3 Imaging System", http://www.canfieldsci.com May 31, 2012, 1 Page.
"Want Your ShapeShot?", Fabbaloo blog post, http://www.fabbaloo.com/blog/2012/5/30/want-your-shapeshot.html May 30, 2012, 3 pages.
Angerman, "3D data capture and 3D imaging earn 'street cred' at Rapid 2012", http://rapidproductdevelopment.biz/2012/06/01/3d-data-capture-and-3d-imaging-earns-street-cred-at-rapid-2012/ Jun. 1, 2012, 6 pages.
"Get a ShapeShot at SIGGRAPH 2011!", Direct Dimensions, Inc. blog post, http://directdimensions.blogspot.com/2011/07/get-shapeshot-at-siggraph-2011.html, Jul. 26, 2011, 2 pages.
"Humor: 3D Photo Booth—peek-a-boo, I see you.", It is Alive in the Lab blog post, http://labs.blog.com/its_alive_in_the_lab/2011/12/humor-3d-photo-booth-peek-a-boo-i-see-you.html, Dec. 15, 2011, 4 Pages.
"3D, me and WebGL, brought together by ShapeShot", GraphicSpeak blog post, http://gfxspeak.com/2011/08/26/3d-me-and-webgl-bought-together-by-shapeshot Aug. 26, 2011, 2 pages.
Chaprnka, Greg, "ShapeShot by Direct Dimensions", Youtube video, https://www.youtube.com/watch?v=NR37NCBOVvu Aug. 26, 2011, 4 pages.
"ShapeShot 3D photobooth website", web archive from Aug. 6, 2012, https://web.archive.org/web/20120806043244/http://www.shapeshot.com/ss_apps.php, Aug. 6, 2012, 2 pages.
"Shapeways 3D Print Service website", web archive from Jul. 26, 2011, www.shapeways.com, Jul. 26, 2011, 4 pages.
"Bre's ShapeShot, by ShapeShot", http://www.thingiverse.com/thing:24078, files published Jun. 6, 2012, 2 pages.
USPTO, "U.S. Appl. No. 13/962,607, Notice of Allowance mailed Apr. 25, 2016", 7 pages.

\* cited by examiner

PHOTO BOOTH FOR THREE-DIMENSIONAL IMAGES

RELATED APPLICATION

This application is a continuation of U.S. patent application Ser. No. 13/962,607 filed Aug. 8, 2013, which claims the benefit of U.S. Prov. App. No. 61/680,989 filed on Aug. 8, 2012, the entire content of each application is hereby incorporated by reference.

BACKGROUND

Photo booths generally provide a small, enclosed space for capturing studio-quality photographs of people. There remains a need for adaptations of photo booths for use with three-dimensional scanners and three-dimensional printers.

SUMMARY

A photo booth is configured with a three-dimensional scanner, along with a display and user interface to interactively operate the photo booth to capture three-dimensional images of a subject and create a digital model of the subject suitable for fabrication with a three-dimensional printer. The user interface can enable various three-dimensional processing functions to customize the digital model according to user input and prepare the digital model for fabrication.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
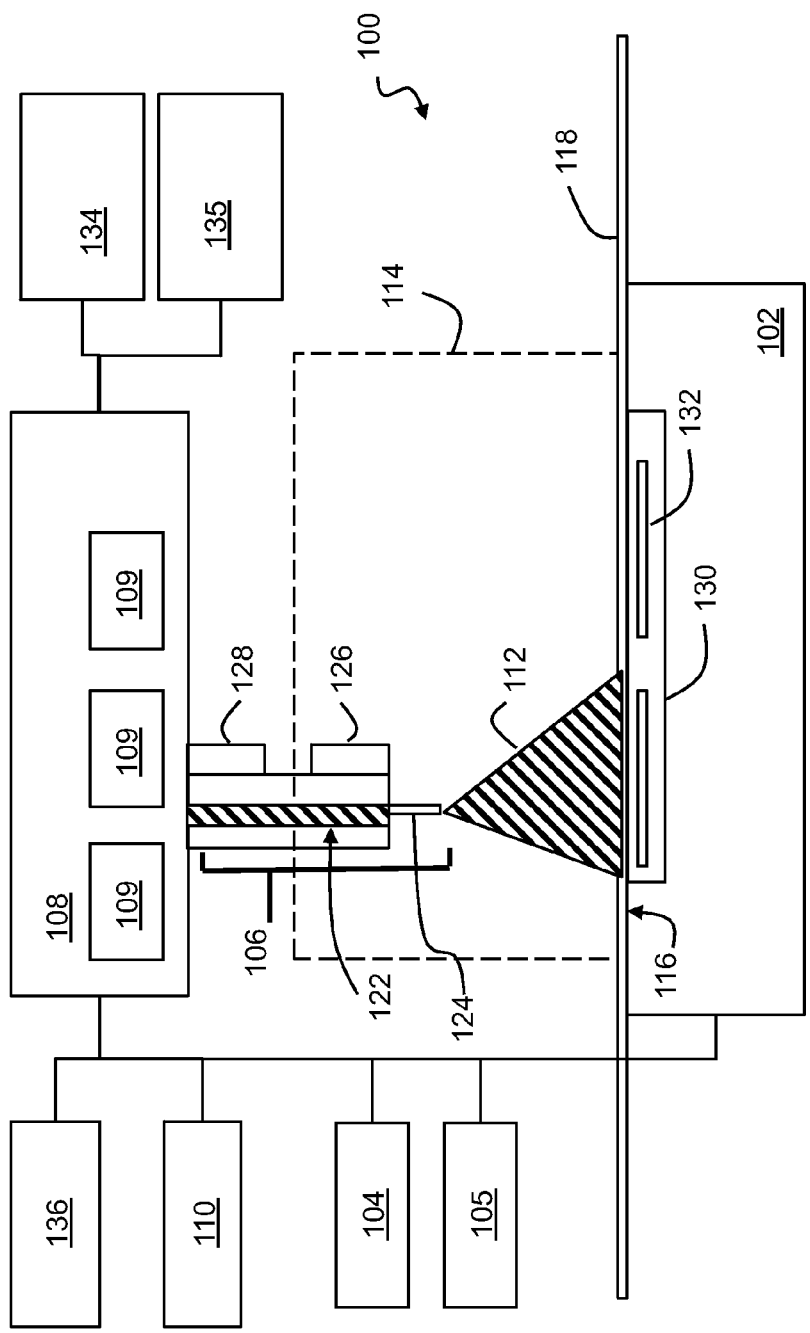
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling effect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 106. This arrangement may advantageously simplify design and improve accuracy by permitting an x-y positioning mechanism for the extruder 106 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
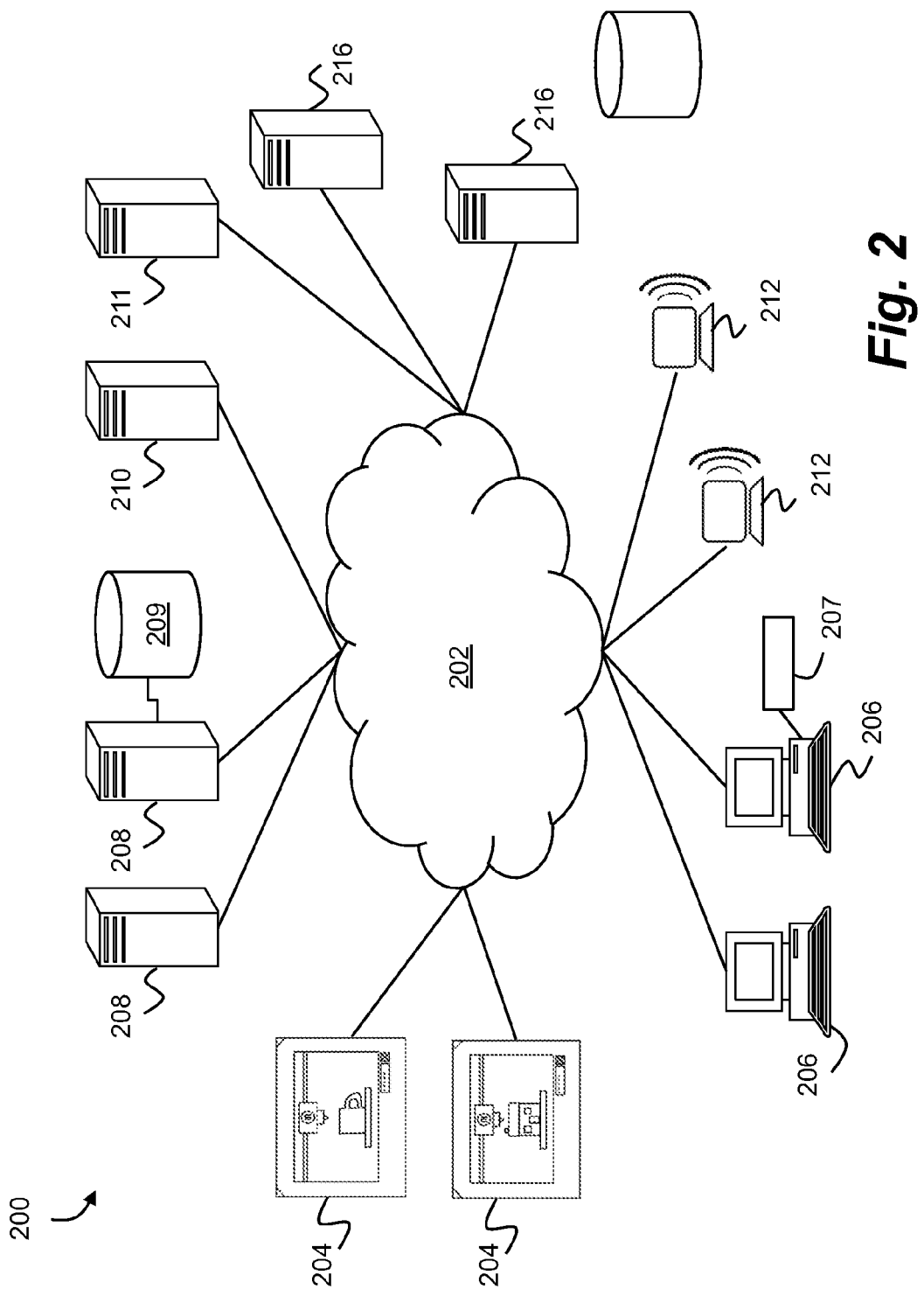
FIG. 2 depicts a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or inter-network(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

A client device 206 may, for example include a removable memory device 207 such as a USB drive, memory stick, or the like, which may be used for example to transfer digital models of three-dimensional objects to printers 204.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210, and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to predetermined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may includes prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
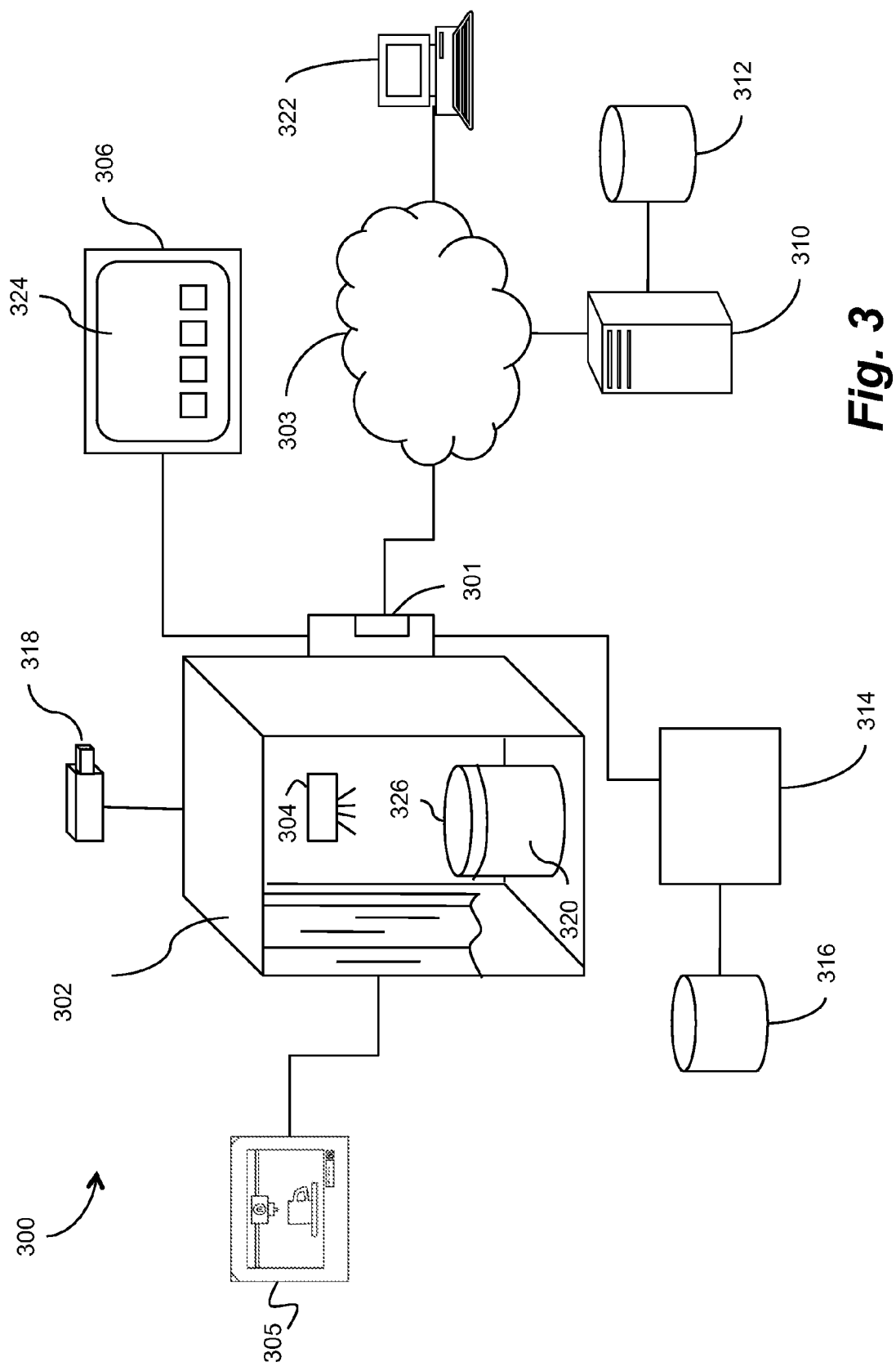
FIG. 3 shows a system with a photo booth and a three-dimensional scanner.

FIG. 3 shows a system with a photo booth having a three-dimensional scanner. The system 300 may include a photo booth 302 with a three-dimensional scanner 304, a seat 320 with rotating base 326, a display 306 with a user interface 324, a network interface 301 coupled to a data network 303, a remote processing resource 310 which may include a storage facility 312, processing circuitry 314 which may include a microprocessor and a storage facility 316, a user device 322, a three-dimensional printer 305, and removable media 318.

In one aspect, the photo booth 302 may be an enclosure sufficiently large for a person to sit or stand. The photo booth 302 may include the seat 320 that may include a rotating base 326, along with a curtain or other partition if privacy is desired. While the rotating base 326 is shown as being on top of the seat 320, the rotating base 326 may also be positioned on the bottom of the seat 320 and therefore may be able to rotate the entire seat 320. A subject may sit on the seat 320 and rotating base 326 to be in position for a three-dimensional scan taken by the three-dimensional scanner 304. While the subject is positioned on the seat 320 during a three-dimensional scan, the processing circuitry 314 may communicate with and rotate the rotating base 326 to rotate the subject up to a three hundred and sixty degree rotation. In one aspect, the rotating capability may be omitted, and the three-dimensional scanner 304 may be configured to capture a three-dimensional scan without movement of the subject.

The three-dimensional scanner 304 may include one or more of a structured light scanner, a shape-from-motion-scanner, a range finding scanner, a laser light scanner, or any other scanner or combination of scanners suitable for capturing three-dimensional images of a subject in the photo booth 302. The three-dimensional scanner 304 may be positioned on one or more of the inner surfaces of the photo booth 302, or in any other suitable location(s) to permit scanning of the subject that is positioned on the seat 320. While the three-dimensional scanner 304 is shown as a single sensor, it should be appreciated that the three-dimensional scanner 304 may include more than one sensor that may be positioned on one or more inner surface of the photo booth 302. In other embodiments, the three-dimensional scanner 304 may include one or more moving cameras or the like that capture data of the subject from various poses during a scan.

The processing circuitry 314 may be coupled to the photo booth 302 and may include a storage facility 316. The storage facility 316 may be incorporated into the processing circuitry 314 or may be a separate facility. While the processing circuitry 314 is shown as being separate from the photo booth 302, it should be appreciated that the processing circuitry 314 may be included as part of the photo booth 302 and may be located anywhere on, within, or nearby to the photo booth 302 (such as in a computer locally coupled to the photo booth 302).

The processing circuitry 314 may be configured to obtain a user identifier and other user information from a user through the user interface 324. In general, the term "user" is intended to refer to an individual who wishes to obtain a scan. An operator, technician or the like may operate the photo booth 302 on the user's behalf as appropriate, in which case, the operator is also considered the "user" as that term is intended herein. In another aspect, the photo booth 302 may be a self-service system that a user can operate without technical assistance. Once the scanning process has begun in the photo booth 302, the processing circuitry 314 may capture the three-dimensional scan data provided by the three-dimensional scanner 304. The processing circuitry 314 may associate the user identifier with the scan data received from the three-dimensional scanner 304. Once the three-dimensional scan data is captured, the processing circuitry 314 may process the scan data to create a three-dimensional model of the scanned subject. The processing circuitry 314 may display the three-dimensional model in the user interface 324 where the user may apply customizations to the model (discussed in more detail below).

Once all model customizations are complete, the processing circuitry 314 may create a fabrication-ready digital model including the user customizations. Before the storage of the model information, the processing circuitry 314 may display the fabrication-ready digital model to the user on the user interface 324 for the user approval of the final fabrication-ready digital model. Once the user approval is received by the processing circuitry 314, the processing circuitry 314 may store the fabrication-ready model in the storage facility 316. In addition to the fabrication-ready model, the processing circuitry 314 may also store the scan data, the user identifier, a two-dimensional rendering of the fabrication-ready model, a preview of the fabrication-ready digital model, and any other useful scan data, metadata, and the like to the storage facility 316.

The photo booth 302 may provide on-site fabrication with a local three-dimensional printer such as the three-dimensional printer 305 shown in FIG. 3. Once the processing circuitry 314 has created and stored the final fabrication-ready digital model, the processing circuitry 314 may send the fabrication-ready digital model to the three-dimensional printer 305 to fabricate the fabrication-ready digital model. In another aspect, the fabrication-ready model and any other related data may be stored on the removable media 318 (such as a removable USB storage device, flash card, or the like) for the user. In another aspect, the fabrication-ready digital model and related data may be stored in the storage facility 312 of the remote processing resource 310 where the user can retrieve the data using a link or the like that is sent to the user via e-mail or some other communication medium.

As used herein, the term "fabrication-ready" is intended to refer to a model suitable for fabrication by a three-dimensional printer. While it will be appreciated that the form of such a model may vary according to the capabilities of a particular printer, it will generally be appreciated that a fabrication-ready model will meet several criteria. In one aspect, this will include objective criteria such as being in a format suitable for use by a printer or related printer software. Thus for example, formats such as STL files can be readily interpreted by many commercially available three-dimensional printers, and hardware instruction code such as g-code can be directly executed by printer hardware. In another aspect, this may include subjective criteria. For example, a model may have holes, double surfaces, or other data deficiencies or the like that render the model unprintable. Similarly, a number of features (such as horizontal ledges or disconnected pieces) cannot be readily fabricated. Thus a variety of design rules may be applied to automatically conform three-dimensional data to printer requirements and provide a fabrication-ready model as contemplated herein. In general, a fabrication-ready model may include any digital model in a form suitable for fabrication using a particular type of printer.

The processing circuitry 314 may augment three-dimensional scanning by providing a number of modeling functions. In one aspect, the processing circuitry 314 may be configured to infer one or more surfaces occluded from the scanned three-dimensional model. For example, where a user faces a three-dimensional scanner, the back of the head may be occluded. Once the occluded surfaces are inferred, the surfaces may be added to the three-dimensional model. To infer an occluded surface, the processing circuitry 314 may use a generic model that may have similarities to the scanned three-dimensional model. Thus for example, a generic model for a skull or head may be used to infer a shape of the back of the head, without requiring a full scan about the circumference of a subject. The processing circuitry 314 may be configured to select the generic model from a plurality of generic models based on one or more features of the three-dimensional model. Thus for example, certain features such as an outline of the face, position of eyes, ears, nose, and the like, or any other features of the subject may be used to select a particular generic head model from among various generic head shapes. Additionally, the determination of a generic model may be based on at least one photograph taken of the subject while the subject was scanned in the photo booth 302. The at least one photograph may include one or more of the surfaces that were occluded from the scanned three-dimensional model. For example, the occluded scan data may have resulted from the subject's ears hiding surfaces behind the ears. A photograph taken during the scanning process may include information of the ear area occluded from the scan data. In another example, a photograph of a profile of the subject may provide useful head shape information for selection of a generic head shape model. An appropriate generic model may be selected based on the similarities between the photograph and one of the generic models. From the selected generic model, three-dimensional information may be taken and the generic model information may be added to the subject three-dimensional model.

The photo booth 302 may be connected to the data network 303 through the network interface 301. In this manner, the photo booth 302 may be coupled in a communicating relationship with network resources such as the remote processing resource 310 and storage facility 312, as well as a user device 322 such as a computer or three-dimensional printer of the user. The storage facility 312 may be incorporated into the remote processing resource 310 or may be an independent network resource.

Once the processing circuitry 314 has completed creating and saving the scan and model data, the processing circuitry 314 may access the remote processing resource 310 through the data network 303, and transmit the scan data, the user identifier, the fabrication-ready digital model, a preview of the fabrication-ready digital model, and a two-dimensional rendering of the fabrication-ready digital model to the remote processing resource 310 for storage. The remote processing resource 310 may create (statically or dynamically) a landing page accessible through the data network 303 and a corresponding link with which the user can retrieve this data. Once the model information is transmitted and stored on the remote processing resource 310, the processing circuitry 314 may transmit the link to the user via e-mail, instant message, or the like. The user may use the user device 322, or other network connected device, to access the model information stored by the remote processing resource 310 using the provided link.

In another aspect, the remote processing resource 310 may be used to assist in computationally expensive three-dimensional processing. For example, the processing circuitry 314 may be configured to transmit raw scan data or the three-dimensional model to the remote processing resource 310 for creation of the fabrication-ready digital model. After the fabrication-ready digital model is created by the remote processing resource 310, it may be transmitted back to the photo booth 302 (or more specifically, to the processing circuitry 314). The process circuitry 314 may then communicate the scan data, the user identifier, the fabrication-ready digital model, and a two-dimensional rendering of the fabrication-ready digital model as described above, or display the fabrication-ready model on the display 306 for user approval.

In another aspect, the removable media 318 may be in a communicating relationship with the photo booth 302. The removable media 318 may be a USB memory device, flash drive, thumb drive, an SD card, a mini SD card, or other removable storage media. As part of the scanning storage process, the user may connect the removable media 318 to the photo booth 302, e.g., through a USB plug or the like. Once the creation of the model information is completed by the processing circuitry 314, the processing circuitry 314 may store the three-dimensional model, the fabrication-ready digital model, the user identifier, and a preview of the fabrication-ready digital model on the removable media 318. Once the storage to the removable media 318 is complete, the user may remove the removable media 318 for personal use.

In an aspect, after the processing circuitry 314 creates the fabrication-ready digital model, the processing circuitry 314 may transmit the fabrication-ready digital model to the user interface 324 where the user may customize the fabrication-ready digital model in a number of manual, semi-automatic, and automatic ways. The user may use the user interface 324 to customize the fabrication-ready digital model by adding features, removing features, or moving features of the model.

For example, the customization may be a modification of a human bust or body with an accessory or physical features may include items such as horns, antennae, hair, additional eyes, glasses, a hat, a crown, jewelry, clothing, or the like. The user may also or instead modify physical characteristics of the bust, such as by moving eyes, ears, nose, mouth, or by enlarging or shrinking such features or changing their shape. The user may also customize the fabrication-ready digital model by specifying a physiological change to the subject by increasing or decrease age, increasing or decreasing weight, adding or removing hair, or the like. Suitable algorithms for such physiological modifications are known in the art and may be usefully employed to modify digital models as contemplated herein. In an embodiment, if the fabrication-ready digital model only includes a human bust, the user may specify a body to be added to the bust such as an animal body, a superhero body, or any other body or body type.

Additionally, the customization may include adding a base, a nameplate with text, an enclosure, or the like to the fabrication-ready digital model. Thus for example, biographical data (date, name) may be added to the model such as by embossing the data in the base of the fabrication-ready digital model, or a plaque or the like may be added in any suitable location. More generally, any personalization, customization, or other modifications may be performed within the user interface 324, including fully manual modifications and any computer-assisted modifications supported by the system 300.

Figure 4:
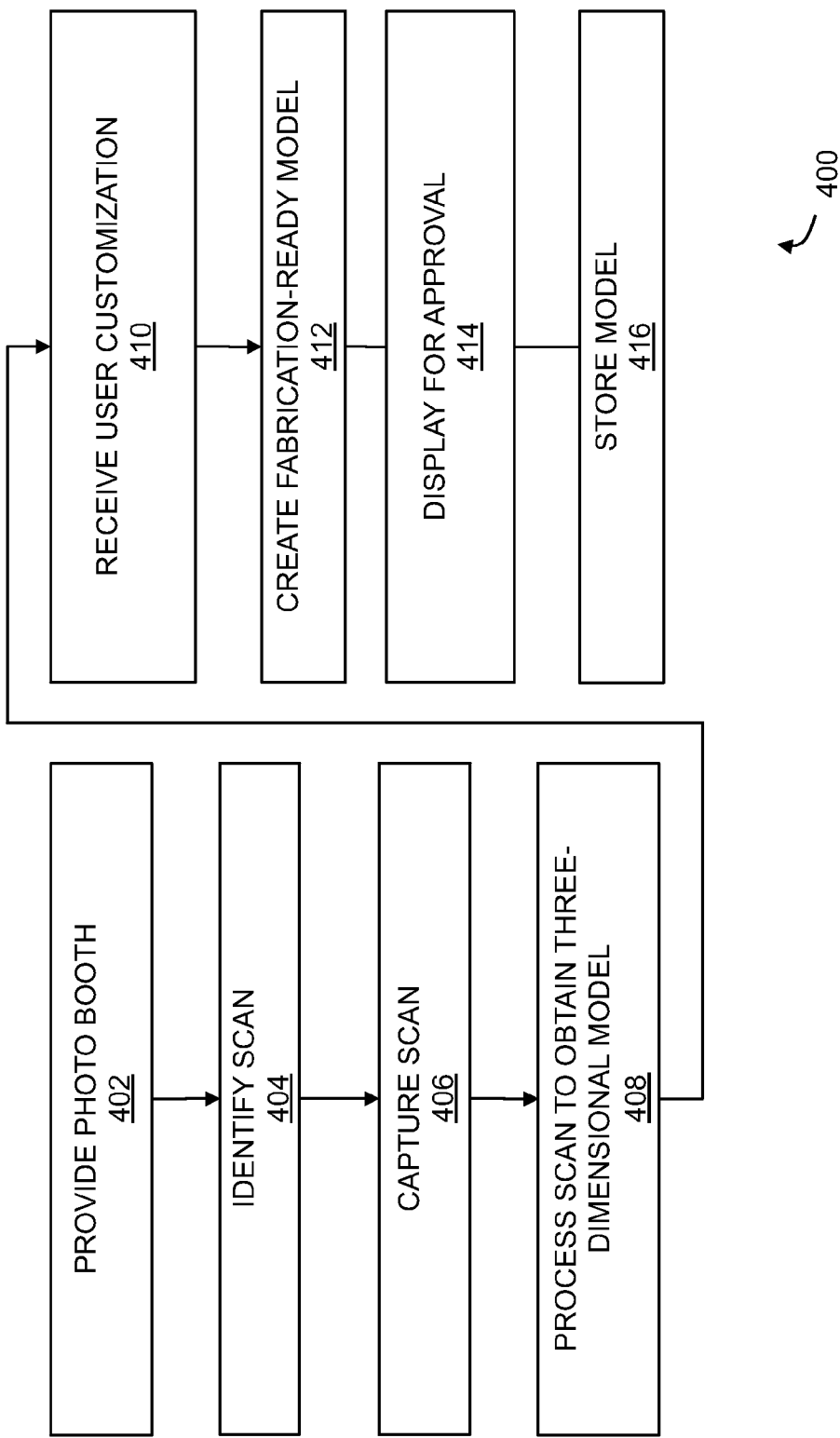
FIG. 4 shows a method for operating a photo booth with a three-dimensional scanner.

FIG. 4 shows a method for operating a photo booth with a three-dimensional scanner.

As shown in step 402, the method 400 may include providing a photo booth and a three-dimensional scanner as generally described above. This may include providing a rotating base to capture multiple views of a subject. The photo booth may also include display providing a user interface for operation of the photo booth.

As shown in step 404, the method 400 may include identifying a scan using any suitable identification information. For example, this may include associating a user identifier and a user with a subject that is about to be scanned. Where the subject is the user, the user identifier may include a name, e-mail address, username, automatically generated unique identifier, or any other suitable label. In one aspect, the user identifier may be a three-dimensional printer associated with the user, so that a fabrication-ready model can be sent immediately to the user's printer as soon as the photo booth process is completed.

As shown in step 406, the method 400 may include capturing a scan of the subject in the photo booth with the three-dimensional scanner. This will generally follow any suitable protocol for the scanning hardware that is used. Where a rotating base is included in the photo booth, this step may include rotating the subject on the rotating base while capturing the scan. The three-dimensional scanner include a structured light scanner, a shape-from-motion-scanner, a range finding scanner, a laser light scanner or any other three-dimensional scanner, as well as combinations of these, suitable for scanning subject matter in the photo booth and providing three-dimensional models thereof.

As shown in step 408, the method 400 may include processing the scan to obtain a three-dimensional model of the subject. It will be appreciated that a variety of three-dimensional scanning techniques exist that capture raw scan data in a variety of forms. Regardless of the form of this data, the raw scan data is generally processed to obtain a three-dimensional representation of the scanned subject matter such as a point cloud or polygonal mesh that can be used as the three-dimensional model for subsequent processing.

As shown in step 410, the method 400 may include receiving a user customization of the three-dimensional model resulting in a modification of the three-dimensional model. A wide variety of manual, semi-automatic and automated modifications may be supported by the method 400, such as through interactions with a user interface of the photo booth.

For example, the user customization may specify a physical modification of a human bust, such as a customization adding horns, antennae, hair, and an additional eye. The customization may also or instead specify an accessory for a human bust such as glasses, a hat, a crown, an item of jewelry, an item of clothing, or some combination of these. In another aspect, the customization may specify a base for the fabrication-ready digital model, text for a nameplate on the fabrication-ready digital model, an enclosure for the fabrication-ready digital model, or any other finishing features. In another aspect, the user customization may specify features for removal from the three-dimensional model, such as moles, blemishes, or other naturally occurring features that a user may wish to exclude from a scan. This may be performed automatically with a "clean model" feature or the like, or manually or semi-automatically by receiving user indications in the user interface of features to be removed. In another aspect, the user customization may specify a physiological change in the subject such as a change in age or weight. This may similarly be performed semi-automatically be receiving user input concerning the change (e.g., +50 pounds), and automatically modifying the three-dimensional model according to the physiological change. In another aspect, the customization may be a user selection of a body for a human bust. For example, a user may obtain a head scan in the photo booth, and add the head to a fanciful body or body type such as an animal, mystical figure (e.g., a satyr or dragon), a science fiction character (e.g., an alien or a storm trooper), a superhero, a military figure (e.g., a knight or a Napoleonic general), or any other human or other character. The user customization may occur at any point during the method 400. For example, the user customization may occur after the scan. In another embodiment the user customization may occur before the scan is captured, or at any other time before a final model is provided to the user.

In general, the user interface may support an interactive environment for changing and adding to a literal scan of a subject. In this manner, a user may obtain a head scan and engage in a variety of creative and fanciful customizations within the user interface to obtain a fabrication-ready model of interest.

As shown in step 412, the method 400 may include creating a fabrication-ready digital model of the three-dimensional model (including any modifications made in step 410). In general, this includes closing holes, smoothing surfaces, identifying and removing scanning artifacts, providing a flat base, ensuring conformity with fabrication or design rules for a three-dimensional printer, and any other processing useful for providing a model in a form amenable to three-dimensional printing.

In order to create a fabrication-ready model, a number of additional processing steps may be taken beyond the direct interpretation of scan results. For example, creating the fabrication-ready digital model may include inferring one or more surfaces of the three-dimensional model that were occluded from the scan, such as a back or top of a human head, or an area behind the ears. This inference may, for example be based upon a generic model for the subject such as a generic head model based on a statistical average of head shapes. In another aspect, a number of generic models may be provided, such as a number of different head shapes, and the method 400 may include selecting the generic model used for inference from the number of generic models based on, e.g., features of the three-dimensional model. Any number of features may be used for this selection. For example, this may be based on eyes, nose, ears, mouth, or any other identifiable features in the model. In another aspect, the selection of a generic model may be based on other information such as a photograph of the subject, e.g., a photograph showing a profile of the head or surfaces excluded from the scan, such as the back of the head.

In general, creating a fabrication-ready model may be computationally expensive, and portions of this processing may be performed with remote resources, or distributed between local and remote resources as appropriate. Thus it will be understood that creating the fabrication-ready digital model may include transmitting one or more of the scan and the three-dimensional model to a remote processing resource and receiving the fabrication-ready digital model from the remote processing resource. This may occur before, during, or after customization as contemplated above.

As shown in step 414, the method 400 may include displaying the fabrication-ready digital model to the user for approval before storing the fabrication-ready digital model. This may include presenting the fabrication-ready digital model in the user interface and permitting a user to review the model from various angles, after which the user may explicitly accept the fabrication-ready model or reject the model and initiate a new scan.

As shown in step 416, the method 400 may include storing the fabrication-ready digital model. The model may be stored, for example, in a local memory of the photo booth, or on a removable media such as a USB drive or the like. The model may also or instead be stored on a server such as a remote server accessible through a data network where the user can retrieve the model at a later time. Where the model is stored on a server or the like, this step may include transmitting a link to the fabrication-ready digital model to the user so that the user can access the model on the server. The link may accordingly identify a landing page hosted by the server that includes (i.e., provides access to) any data relating to the scanning process including without limitation the scan (e.g., raw scan data), three-dimensional model, the fabrication-ready digital model, a two-dimensional rendering of the fabrication-ready digital model or other preview (s) of the model, the user identifier, time and date stamps, and so forth. As noted above, any of this information may also or instead be stored on removable media coupled in a communicating relationship with the photo booth.

As shown in step 418, the method 400 may include fabricating the fabrication-ready digital model with a three-dimensional printer. This may include sending the fabrication-ready digital model to a printer locally coupled to the photo booth or sending the fabrication-ready digital model to a remote printer, such as a three-dimensional printer associated with the user.

The methods or processes described above, and steps thereof, may be realized in hardware, software, or any combination of these suitable for a particular application.

The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
   a photo booth with a three-dimensional scanner;
   a display with a user interface coupled to the photo booth;
   a network interface configured to couple the photo booth in a communicating relationship with a remote processing resource; and processing circuitry configured to:
associate a user identifier and a user with a subject;
capture a scan of the subject in the photo booth with the three-dimensional scanner;
process the scan to obtain a three-dimensional model of the subject, the three-dimensional model including a scanned bust of the subject;
receive a user customization of the three-dimensional model in the user interface, the user customization including a user selection of a body from a plurality of bodies and combination of the scanned bust with the body to obtain a three-dimensional model of the scanned bust on the body;
present a preview of the three-dimensional model to the user;
create a fabrication-ready digital model of the three-dimensional model including the user customization; and
store the fabrication-ready digital model.

2. The system of claim 1 further comprising a three-dimensional printer coupled in a communicating relationship with the photo booth, wherein the processing circuitry is further configured to fabricate the fabrication-ready digital model with a three-dimensional printer.

3. The system of claim 1 wherein the processing circuitry is configured to store the fabrication-ready digital model on the remote processing resource.

4. The system of claim 3 wherein the processing circuitry is further configured to transmit a link to the fabrication-ready digital model on the remote processing resource to the user.

5. The system of claim 4 wherein the link identifies a landing page that includes the three-dimensional model, the fabrication-ready digital model, and a two-dimensional rendering of the fabrication-ready digital model.

6. The system of claim 3 wherein the processing circuitry is further configured to store the scan, the user identifier, and the preview of the fabrication-ready digital model on the remote processing resource.

7. The system of claim 1 wherein the processing circuitry is further configured to store the three-dimensional model, the fabrication-ready digital model, the user identifier, and the preview of the fabrication-ready digital model on a removable media coupled in a communicating relationship with the photo booth.

8. The system of claim 1 wherein the processing circuitry is further configured to display the fabrication-ready digital model to the user in the user interface for approval before storing the fabrication-ready digital model.

9. The system of claim 1 further comprising a rotating base in the photo booth, wherein the processing circuitry is further configured to rotate the subject on the rotating base while capturing the scan.

10. The system of claim 1 wherein the three-dimensional scanner is one or more of a structured light scanner, a shape-from-motion-scanner, a range finding scanner, and a laser light scanner.

11. The system of claim 1 wherein the processing circuitry is further configured to transmit one or more of the scan and the three-dimensional model to the remote processing resource and receive the fabrication-ready digital model from the remote processing resource.

12. The system of claim 1 wherein the user customization specifies a physical modification of the scanned bust.

13. The system of claim 12 wherein the physical modification includes one or more of horns, antennae, hair, and an additional eye.

14. The system of claim 1 wherein the user customization specifies an accessory for the scanned bust.

15. The system of claim 14 wherein the accessory includes one or more of glasses, a hat, a crown, an item of jewelry, and an item of clothing.

16. The system of claim 1 wherein the user customization specifies one or more of a base for the fabrication-ready digital model, text for a nameplate on the fabrication-ready digital model, and an enclosure for the fabrication-ready digital model.

17. The system of claim 1 wherein the user customization specifies one or more features for removal from the three-dimensional model.

18. The system of claim 1 wherein the user customization specifies a physiological change in the subject relating to one or more of age and weight, and wherein the system further includes automatically modifying the three-dimensional model according to the physiological change.

19. The system of claim 1 wherein the processing circuitry is further configured to infer one or more surfaces of the three-dimensional model occluded from the scan based upon a generic model for the subject.

20. The system of claim 1 wherein the plurality of bodies includes one of an animal, a mystical figure, a science fiction character, a superhero, and a military figure.

* * * * *